Sept. 17, 1968      G. A. VAKA      3,401,787
ACTUATING MECHANISM FOR RETRACTABLE PLOW FEEDER BLADES
Filed March 22, 1967      3 Sheets-Sheet 1
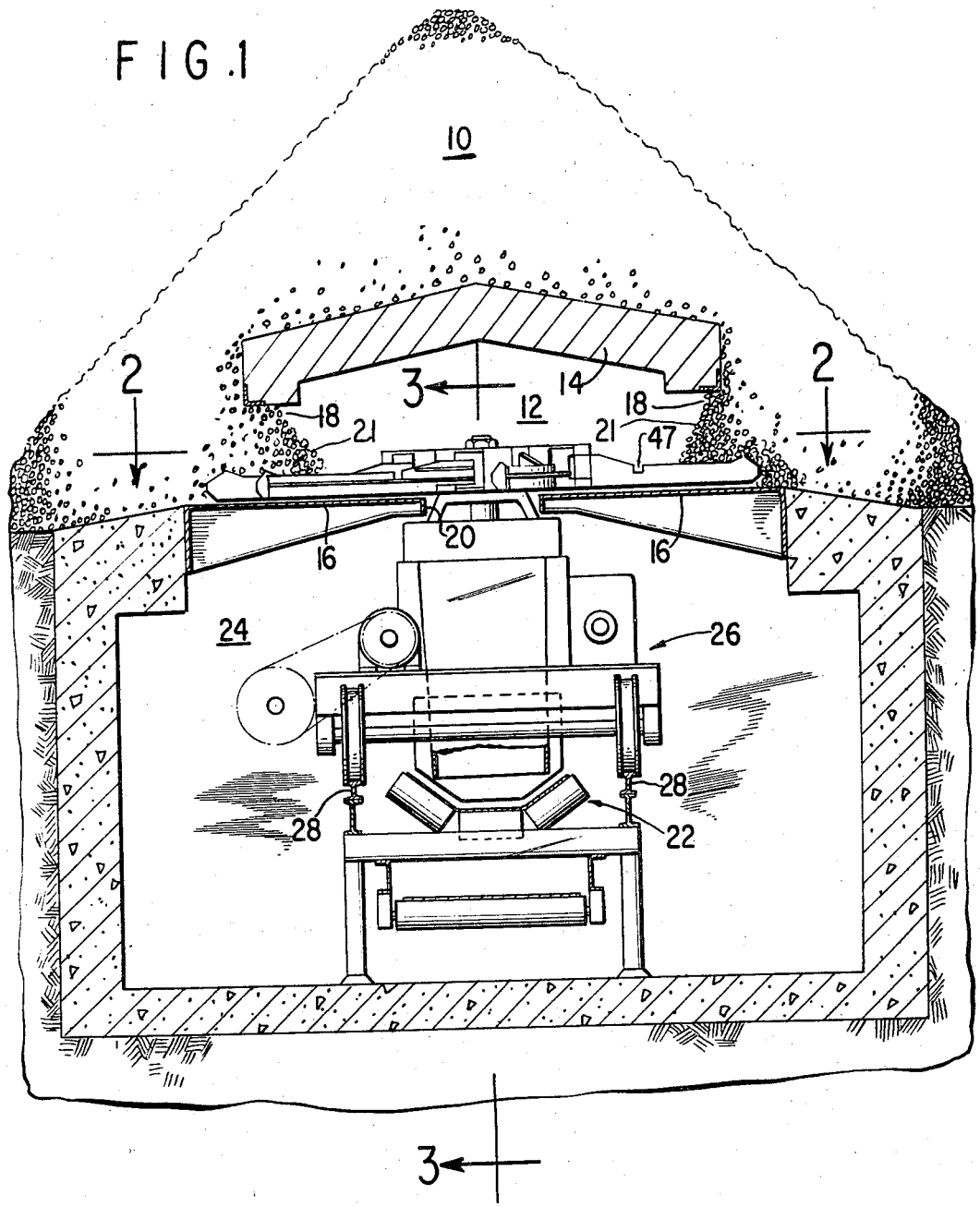
INVENTOR
GREGORY A. VAKA
ATTORNEY

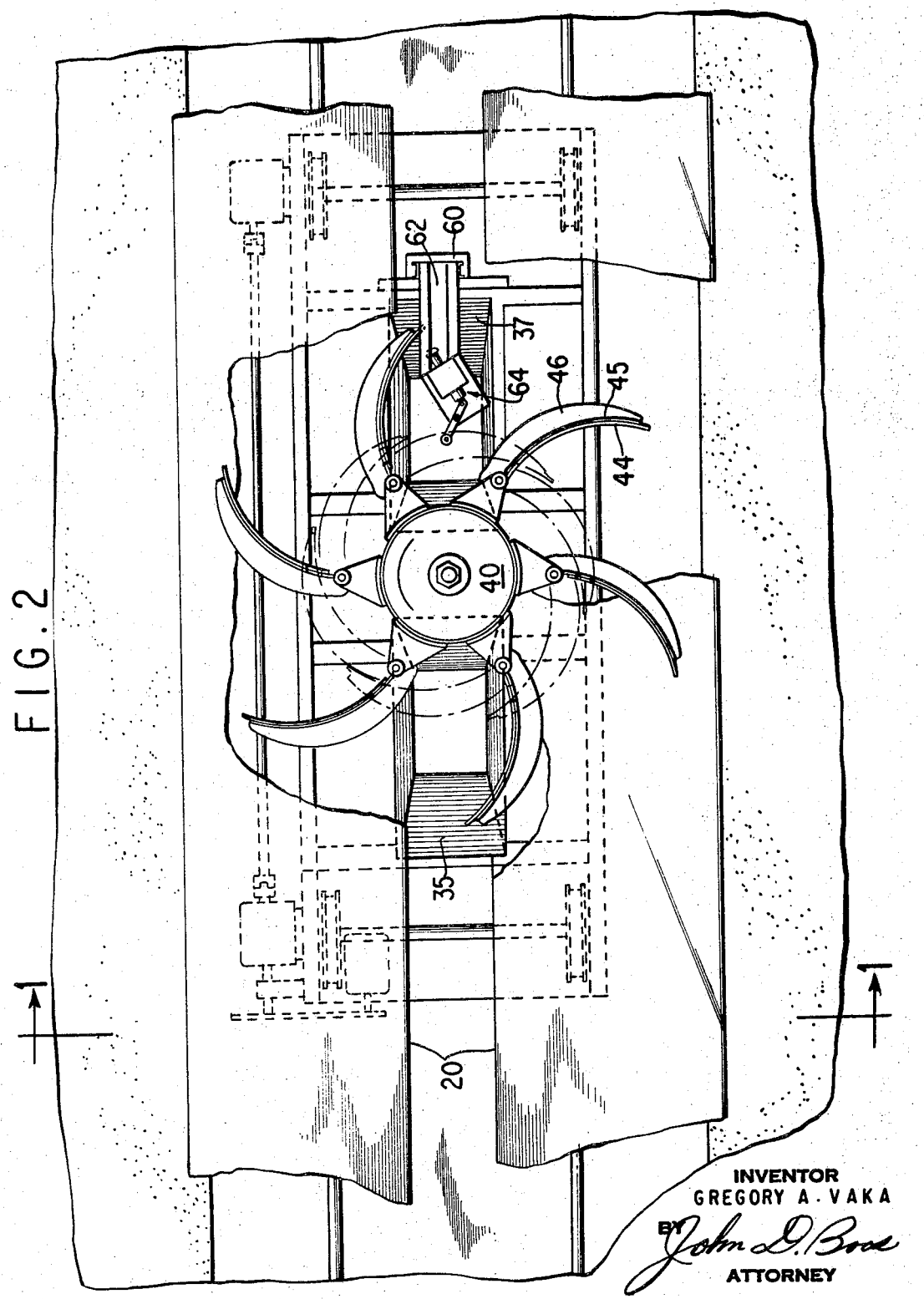

Sept. 17, 1968     G. A. VAKA     3,401,787
ACTUATING MECHANISM FOR RETRACTABLE PLOW FEEDER BLADES
Filed March 22, 1967     3 Sheets-Sheet 3
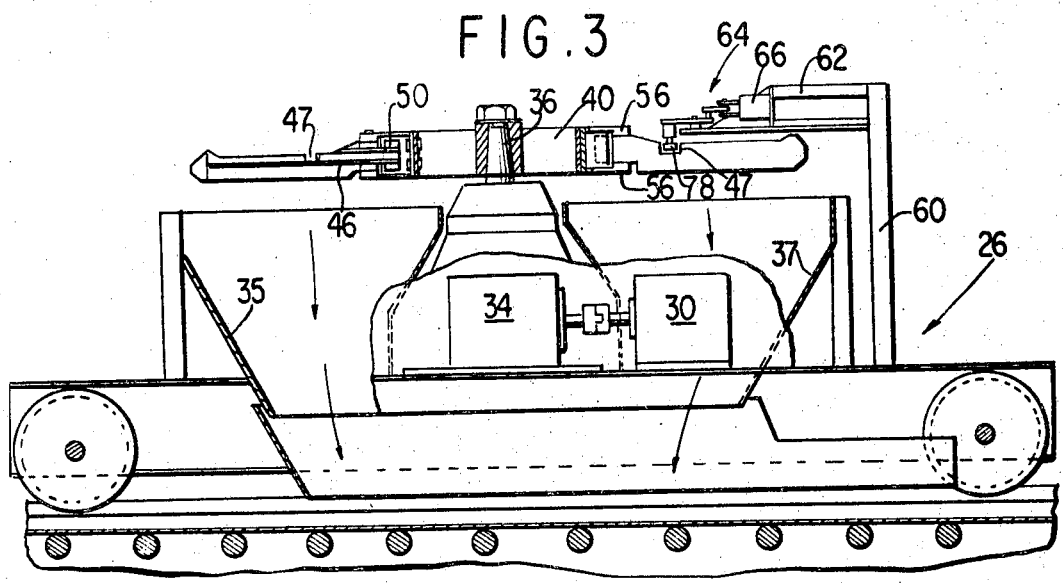
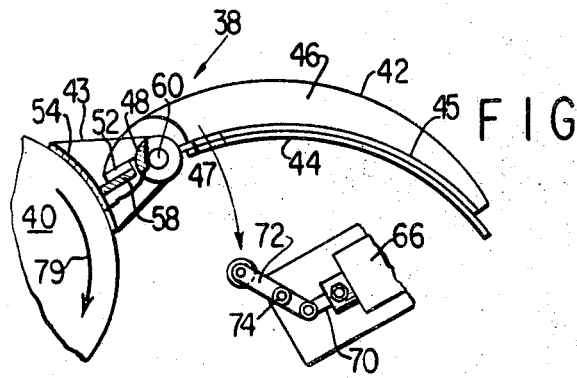
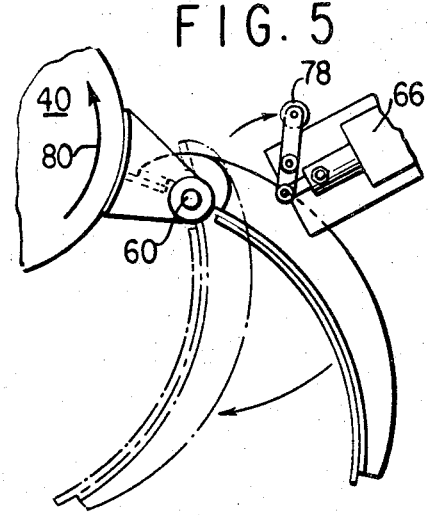
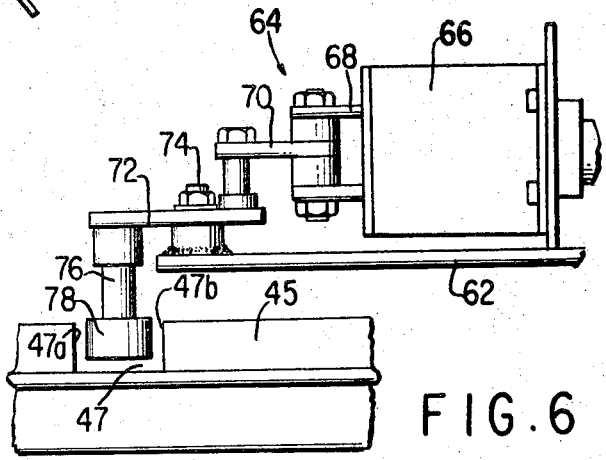
INVENTOR
GREGORY A. VAKA
BY John D. Boos
ATTORNEY United States Patent Office 3,401,787
Patented Sept. 17, 1968

3,401,787
ACTUATING MECHANISM FOR RETRACTABLE
PLOW FEEDER BLADES
Gregory A. Vaka, Montville, N.J., assignor to Hewitt-Robins Incorporated, Stamford, Conn.
Filed Mar. 22, 1967, Ser. No. 625,186
7 Claims. (Cl. 198—36)

ABSTRACT OF THE DISCLOSURE

This invention relates to an actuating mechanism on a rotary plow feeder which will open or close the pivotal plow blades of the rotary plow element.

Background of invention

This invention relates to retractable plow feeder blades and more particularly to an actuating mechanism for positive opening and closing the retractable blades on rotary plow feeders.

Rotary plow feeders are primarily intended for use in reclaiming stockpiled bulk materials. In use, the rotary plow feeder is located in a tunnel which extends underneath the stockpile of bulk material. Extending along substantially the entire length of the base of the tunnel is a longitudinal slot which opens over a belt conveyor, or the like, for removing the material from the stockpile. The stockpiled material enters the tunnel through openings along the sides of the tunnel and comes to rest at the sides of the longitudinal slot. A feeder carriage mounted for movement along the length of the tunnel is provided with one of more rotary plow elements having radial blades which are rotatably driven about a vertical axis. Rotation of the plow elements cause the plow blades to engage the material on either side of the longitudinal slot and convey the material over the sides of slot onto the belt conveyor below.

It frequently occurs that more than one type bulk material is stored along the length of the tunnel. In such circumstances it is necessary that the feeder carriage be capable of being readily positioned at any point in the tunnel so as to enable the selective discharge of any of the bulk materials stored along the length of the tunnel. It is thus necessary to design the feeder carriage so that the carriage can be moved along the length of the tunnel without having the plow blades performing a reclaiming function. This is conventionally accomplished by having the blades pivotally connected to a central hub. In this manner it is possible to fold the plow blades around the hub, move the carriage from one location in the tunnel to another without reclaiming and then reopen the blades for reclaiming the bulk material at this new location.

The advantages derived from this pivotal plow blade design will be greatly tempered by any manual steps required to effect an extension, retraction or locking of the pivotal plow blades. Furthermore, the complexity of any manual operation on the plow element is greatly increased by the normal inaccessibility of the plow element within the storage tunnel. Thus, there is a definite need for an actuating mechanism which will enable the plow blades to be automatically extended or retracted and which mechanism can be controlled from a remote location.

There is also the problem of insuring that the pivotal blades are in either the fully extended position or in the folded position. If, for example, the blade is not in the proper extended position, the blade will enter the material on the shelf at an improper angle and may thereby decrease the reclaiming capacity of the plow element. If, on the other hand, the blades are not completely folded around the hub, it is possible that accidental reclaiming of undesired material will occur when the feeder carriage is moved from one position to another in the tunnel. This problem is further compounded by the existence of dust, particles and dampness in the tunnel which combine to increase the possibility of jamming or fouling the pivotal connections of the blades. It is also possible that in some cold locations the dampness or water around the pivotal connections of the blades will freeze and thereby also hinder the proper extension or retraction of the plow blades. All these environmental conditions increase the possibility that the plow blades will not be positioned in either an opened or closed position.

Summary of the invention

The above described problems are solved in the present invention by the use of a blade deflector connected to a solenoid operated actuating mechanism for positioning the deflector in either of two positions. The actuating mechanism positions the blade deflector in the first or normal position when the plow element is rotated in a reclaiming direction. In this position the deflector will contact and open the blades only when the blades are not already in an extended position. The actuating mechanism will position the blade deflector in the second position when the direction of rotation of the plow element is reversed. In this second position the blade deflector urges all the plow blades into a closed or folded position.

Accordingly, one object of the present invention is to provide an actuating mechanism for opening and closing retractable plow blades on a rotary plow feeder.

Still another object is to provide an actuating mechanism on a rotary plow feeder carriage which can be controlled from a remote location and which will both open and close retractable plow blades.

A further object of this invention is to provide an actuating mechanism which positions a blade deflector in the path of a rotary plow element having pivotal plow blades in order to position the plow blades in an extended or retracted position.

Still a further object is to provide a plow feeder having the combination of a rotary plow element with pivotal plow blades and a solenoid operated actuating mechanism which moves the plow blades between an opened and closed position.

Other objects, advantages and novel features of the present invention will become apparent from the following detailed description of the invention when considered in conjunction with the accompanying drawings wherein:

FIG. 1 is a cross-sectional view taken along line 1—1 of FIG. 2 of a bulk material storage area and showing an end view of a rotary plow feeder mounted for reclaiming the stored bulk material;

FIG. 2 is a view taken along lines 2—2 of FIG. 1, with parts broken away, showing a plan view of the feeder carriage;

FIG. 3 is a view taken along lines 3—3 of FIG. 1, showing a cross sectional view of the side of the feeder carriage with parts broken away;

FIG. 4 is a top view of a blade assembly with parts broken away and showing the actuating mechanism in the first position;

FIG. 5 is a view similar to FIG. 4 showing the actuating mechanism in the second position and showing the blade in both an opened and closed position;

FIG. 6 shows the cam control structure for the plow.

Description of the preferred embodiments

Referring now to FIGS. 1 and 2, there is illustrated a typical bulk material storage area in which the bulk material 10 is stored over a relatively long first tunnel 12 formed by a roof 14 spaced above the floor sections 16, 16 so that slot-type openings 18, 18 are formed along each side of the tunnel. A longitudinal base slot 20 is centrally formed at the base or floor of the tunnel by the spaced apart floor sections 16, which act as storage shelves. The size of the slot openings 18 along the sides of the tunnel and the width of the shelves 16, 16 are so related to the natural angle of repose of the material that the material enters the first tunnel and comes to rest on shelves 16, 16 as indicated at 21. Directly below base slot 20 is a belt conveyor 22 located in a second tunnel 24. A carriage 26 is mounted for traveling along tracks 28 in the second tunnel. A motor 30 is mounted on the carriage and drives a rotary plow element 32 located in the first tunnel 12 through a reduction gear unit 34 and vertically extending shaft 36. Chutes 35, 37 are also mounted on the carriage and guide the material reclaimed off shelves 16, 16 as it falls onto the conveyor 22.

The rotary plow element is made up of a plurality of blade assemblies 38 bolted to the periphery of a central spider or hub 40 that is keyed to the end of shaft 36. Since each blade assembly is identical only one will be described in detail. The blade assembly is made up of a blade 42 pivotally connected to a hinge bracket 43. The plow blade 42 comprises a blade liner 44 removably attached to a support plate 45 formed with a central reinforcing rib 46 on the back of the plate.

A rectangular slot 47 is formed close to the inner end of the blade and acts as a bypass means as will hereinafter be described. The slots are cut inwardly from the upper edge of the blade and extend downwardly to the center reinforcing rib. The inner end of the back support plate is formed with a tongue 48 and the central rib extends beyond the tongue portion for a short distance. A second reinforcing rib 50 (FIG. 3) is formed on the back of plate 44 at the inner end and extends from the vicinity of slot 47 to a location a short distance beyond tongue 48 in a manner similar to central rib 46. A butt plate 52 is connected to the ends of ribs 46, 50 for positioning the blade in an extended position. The hinge bracket 43 has a curved base plate 54 which is bolted or otherwise attached to the periphery of the central spider or hub 40. Projecting outward from the base plate are two spaced lugs 56 (FIG. 3) and a web portion 58 between the lugs. The web portion extends upwardly between lugs for only a portion of total height of the lugs. The tongue 48 of the plow blade extends between the spaced lugs 56 of the hinge bracket and are joined together by pin 60. It will be recognized that the pivotal connection of the blade to the bracket enables the plow blade to be pivoted into a folded or retracted position as shown in phantom lines in FIG. 2. Furthermore, when the plow blade is pivoted into an opened or extended position the butt plate 52 on the ends of the reinforcing ribs 46, 50 comes into contact with the abuts the web portion 58 formed between the mouning lugs. In this manner the plow blade is positioned in the proper extended position.

Projecting vertically upwardly from the carriage 26 through slot 20 and into the first tunnel 12 is a structural support member 60. Connected to the end of upright member 60 is a horizontal member 62 which mounts an actuating mechanism 64 over the path of the plow element. The actuating mechanism 64 comprises a solenoid powered positioning means which actuates a linkage system. A blade deflecting roller 78 is coupled to the linkage system and is adapted to contact the plow blades, as will hereinafter be described. The positioning means comprises solenoid 66 and a spring biased shaft member 68 which is movable between a retracted and an extended position and which is normally spring biased into the retracted position. When the solenoid is energized the member 68 is moved into the extended second position. It should be obvious that many equivalent mechanical, hydraulic, pneumatic or electrical means could be employed in lieu of solenoid 66. The linkage mechanism comprises link 70, lever 72 and shaft 76. The member 68 is pivotally connected to one end of a link 70. The other end of link 70 is pivotally connected to one end of lever 72 which is mounted for pivotal movement in a horizontal plane about a pivot 74 intermediate the ends of the lever. A shaft 76 mounting blade deflecting roller 78 is connected to the other end of lever 72. The shaft extends vertically downward from lever 72 and positions deflecting roller 78 in the normal path of rotation of the plow blades. The diameter of the deflecting roller is less than the width of the slots 47 formed in the plow blades.

The solenoid is electrically coupled to the controls, not shown, of the electrical motor 30, as is well known in the art, such that when the motor drives the plow element in the reclaiming direction, as shown by arrow 79, the solenoid is inactivated and when the motor drives the plow element in the reverse direction, as shown by arrow 80, the solenoid is activated. When the solenoid is actuated the plunger 68 is extended and the deflecting roller is pivoted back into the second position shown in FIG. 5. When the solenoid is inactivated the plunger is urged by a spring means, not shown, into an extended position and thus positioning the deflecting roller into a first position.

In operation, when the plow element is normally rotating in a reclaiming direction with the plow blades in an extended position, the deflecting roller 78 is located in the first position shown in FIG. 4. The fully extended plow blades rotate past the deflecting roller with the sidewalls 47a, 47b of the blade slots 47 passing opposite sides of the deflecting roller, as shown in FIG. 6. In this manner the slots 47 act as a bypass means for the plow blades. If the feeder carriage is to be positioned at a new location along the length of tunnel 24, the direction of rotation of the plow element is reversed. The solenoid 66 is energized when the direction of rotation is reversed and the deflecting roller is positioned in the second position shown in FIG. 5. The back of the support plates 44 for the plow blades successively come into contact with the deflecting roller and urge the plow blade into the closed or folded position shown by the phantom lines in FIG. 5. Each successive blade is thus closed until all the blades are positioned around the central hub as shown in the phantom lines shown in FIG. 2. The feeder carriage may now be moved in either direction without having the plow blades contact the material on either shelf 18 and any accidental reclaiming is thereby avoided. When the feeder carriage has reached the new location the plow element is again rotated in the reclaiming direction, thereby inactivating the solenoid. This permits the deflecting roller to again return to the first position. In this position the deflecting roller comes in contact with the plow surface of one of the blade liners 44 at a location close to end of blade. As the plow element is rotated the blade is pivoted about pin 60 into an opened position, the roller 78 rolls along the surface of liner 44 toward the slot 47 of the blade. When the blade reaches its extended position the deflecting roller passes through the slot 47 and the roller comes into contact with the plow surface of the next blade liner. In this manner each successive blade is opened into an extended position. It will also be recognized that the deflecting means will urge any partially opened blades into the extended position if, for example, the bulk material accidentally causes one or more of the blades to partially close while in operation. Likewise, the deflecting roller will close any partially opened blades when the plow element is rotated in the reverse direction and the deflecting roller is in the second position.

The actuating mechanism described above has been applied to a rotary plow feeder having a specific type of pivotal plow blade design, however, it will be recognized that the described invention could be applied to rotary plow elements having different pivotal blade designs. For example, the blades could all be interconnected such that the blades pivot in unison and the actuation of one blade would actuate all blades. Furthermore, more than one actuating mechanism could be positioned around the periphery of a single rotary element.

Obviously many modifications and variations of the present invention are possible in light of the above teachings. It is therefore to be understood that within the scope of the appended claims the invention may be practiced otherwise than has been specifically described.

What is claimed is:

1. A rotary plow feeder comprising a rotary plow element having a plurality of plow blades movable between a folded and an extended position, drive means coupled to said plow elements for rotatably driving said plow elements in either a reclaiming direction or a reverse direction, an actuating mechanism, a blade deflecting means coupled to and positioned by said actuating mechanism, said actuating means positioning said blade deflecting means in a first position when said plow element is rotating in a reclaiming direction and positioning said blade deflecting means in a second position when said plow element is rotating in a reverse direction, said blade deflecting means in the first position successively contacting said plow blades when said plow blades are in a folded position or positioned between a folded and an extended position in order to urge said plow blades which are thus contacted into an opened position, said blade deflecting means in the second position successively contacting said plow blades when said plow blades are in an extended position or positioned between an extended and a folded position in order to urge said plow blades which are thus contacted into a folded position.

2. The rotary plow feeder described in claim 1 which is further characterized by each of said plow blades being formed with a bypass means therein that permits said plow blades to pass said blade deflecting means when said plow blades are in an extended position.

3. The rotary plow feeder described in claim 2 wherein said bypass means comprises spaced apart side walls in each of said plow blades, said side walls being located in said plow blades such that the side walls for each of said plow blades pass on opposite sides of said blade deflecting means when said plow element is rotated in a reclaiming direction with said plow blades in an extended position.

4. The rotary plow feeder described in claim 3 wherein said actuating means comprises a powered positioning means and a linkage mechanism, said blade deflecting means being coupled to said linkage mechanism, said positioning means being coupled to said linkage mechanism so that the actuation of said positioning means actuates said linkage mechanism and moves said blade deflecting means from the first position into the second position.

5. The rotary plow feeder described in claim 4 wherein said positioning means is a solenoid mechanism having a member spring biased into a retracted position when said solenoid mechanism is unenergized and movable into an extended position when said solenoid mechanism is energized, said member being coupled to said linkage mechanism so as to urge the said blade deflecting means into the first position when said member is in a retracted position, said blade deflecting means being moved into the second position when said solenoid mechanism is energized and said member is moved into an extended position.

6. The rotary plow feeder described in claim 5 wherein said linkage mechanism interconnecting said solenoid mechanism and said blade deflecting means comprises a lever pivotally mounted intermediate the end of said lever, a shaft coupled to one end of said lever, said blade deflecting means coupled to said shaft, a link means pivotally connected to the other end of said lever and also pivotally connected to said member.

7. The rotary plow feeder described in claim 5 wherein said blade deflecting means is a roller rotatably mounted on one end of said shaft.

References Cited

UNITED STATES PATENTS 3,228,514  1/1966  Kucera _____ 198—36 X

EDWARD A. SROKA, *Primary Examiner.*